US007461703B2

(12) United States Patent
Cheng

(10) Patent No.: US 7,461,703 B2
(45) Date of Patent: Dec. 9, 2008

(54) AIR-INLET CONTROLLING ASSEMBLY FOR A PNEUMATIC TOOL

(76) Inventor: Ming-Kun Cheng, No. 38-11, Lin 10, Chungcheng Li, Yuanli Chen, Miaoli Hsien (TW)

(*) Notice: Subject to any disclaimer, the term of this patent is extended or adjusted under 35 U.S.C. 154(b) by 370 days.

(21) Appl. No.: 11/498,245

(22) Filed: Aug. 3, 2006

(65) Prior Publication Data

US 2008/0073093 A1 Mar. 27, 2008

(51) Int. Cl.
*B23B 45/00* (2006.01)
*B25B 9/00* (2006.01)

(52) U.S. Cl. ...................... 173/169; 173/93.5; 173/168; 173/170

(58) Field of Classification Search ................... 173/93, 173/93.5, 170, 168, 169, 171
See application file for complete search history.

(56) References Cited

U.S. PATENT DOCUMENTS 3,934,657 A * 1/1976 Danielson ................... 173/169
4,416,338 A * 11/1983 Nelson et al. ............... 173/206
4,643,263 A * 2/1987 Karden ....................... 173/168
5,346,024 A * 9/1994 Geiger et al. ............... 173/221
5,918,370 A * 7/1999 Wells ......................... 30/228
5,924,497 A * 7/1999 Spooner et al. ............. 173/169
6,155,354 A * 12/2000 Pusateri et al. .............. 173/170
6,161,628 A * 12/2000 Liu ............................ 173/168
6,220,367 B1 * 4/2001 Masterson et al. ....... 173/162.2
6,491,113 B1 * 12/2002 Heinrichs ................... 173/169
6,880,645 B2 * 4/2005 Izumisawa ................. 173/93.5
7,025,150 B2 * 4/2006 Chen .......................... 173/169
7,213,500 B2 * 5/2007 Chang ......................... 91/418

* cited by examiner

*Primary Examiner*—Scott A. Smith
(74) *Attorney, Agent, or Firm*—Rosenberg, Klein & Lee

(57) ABSTRACT

An air-inlet controlling assembly for a pneumatic tool having a gun shaped shell with a chamber and a handle communicated with the chamber has an air-inlet assembly, a cylinder assembly and a control valve. The air-inlet assembly is mounted in the handle of the shell and has an inlet tube, an airtight sleeve and a washer. The cylinder assembly is mounted in the shell, contacts with the airtight sleeve of the air-inlet assembly and has a cylinder and a rotor. The control valve is connected to the cylinder assembly and has a connecting portion and an operating portion.

14 Claims, 8 Drawing Sheets

AIR-INLET CONTROLLING ASSEMBLY FOR A PNEUMATIC TOOL

BACKGROUND OF THE INVENTION

1. Field of the Invention

The present invention relates to an air-inlet controlling assembly, and more particularly to an air-inlet controlling assembly for a pneumatic tool with a plastic shell.

2. Description of Related Art

Conventional pneumatic tools always have a metal shell and a heavy weight, and are inconvenient and laborious in use. Therefore, the shell of a conventional pneumatic tool is made of plastic material to decrease the weight of the conventional pneumatic tool.

In generally, the conventional pneumatic tools are used to fasten or loosen bolts or nuts and usually have an air-inlet controlling assembly and a driving shaft.

The air-inlet controlling assembly is mounted in the conventional pneumatic tool to control the flow direction of a compressed air. The driving shaft is connected to the air-inlet controlling assembly. Then, the driving shaft can apply to fasten or loosen the bolts and the nuts by changing the flow direction of the compressed air with the air-inlet controlling assembly.

With reference to FIG. 5, a first conventional air-inlet controlling assembly has a cylinder (50), a port device (51) and a control device (52). The cylinder (50) is hollow, is mounted in a conventional pneumatic tool and has a bottom and an inlet (501). The inlet (501) is formed in the bottom of the cylinder (50). The port device (51) is mounted in the cylinder (50) and has a bottom, an annular sidewall, a through hole (512) and two discharging holes (511). The through hole (512) is formed in the bottom of the port device (51) and communicates with the inlet (501) of the cylinder (50). The discharging holes (511) are formed through the annular sidewall of the port device (51) and away from the through hole (512). The control device (52) is connected to the port device (51) and has two cavities (521).

With reference to FIG. 6, a second conventional air-inlet controlling assembly is mounted in a conventional pneumatic tool having a shell (60). The shell (60) has a chamber (61), and the second conventional air-inlet controlling assembly is mounted in the chamber (61) of the shell (60) and has a cylinder (62) and a sealing slab (63). The cylinder (62) is hollow, is mounted in the chamber (61) and has a bottom and an airtight board (621). The airtight board (621) is formed on and protruded inclinedly from the bottom of the cylinder (62) to contact with the shell (60) and has an inlet (622). The inlet (622) is formed through the airtight board (621). The sealing slab (63) is attached to the airtight board (621) and has a through hole communicated with the inlet (622).

The airtight board (621) and the sealing slab (63) are contacted closely with the shell (60) to prevent a compressed air from flowing inside the chamber (61) to damage the conventional pneumatic tool.

With reference to FIG. 7, a third conventional air-inlet controlling assembly is mounted in a conventional pneumatic tool having a shell (70). The third conventional air-inlet controlling assembly is mounted in the shell (70) and has a cylinder (80) and a control shaft (82). The cylinder (80) is mounted in the shell (70) and has a bottom and a valve (81). The valve (81) is mounted axially in the bottom of the cylinder (80) and has a through hole (811). The through hole (811) is communicated with the cylinder (80) and allows compressed air to flow into the cylinder (80). The control shaft (82) is extended through the shell (70), is connected to the cylinder (90) to change the flow direction of the compressed air.

With reference to FIG. 8, a conventional pneumatic tool (90) has a shell (91) and holds a fourth conventional air-inlet controlling assembly inside. The fourth conventional air-inlet controlling assembly is mounted in the shell (91) and has a cylinder (92) and a pushing device (93). The cylinder (92) is mounted in the shell (91) and has a bottom and a valve (921). The valve (921) is mounted in the bottom of the cylinder (92) and has two through holes (922). The through holes (922) are communicated with the cylinder (92). The pushing device (93) is mounted on the shell (91) and has two buttons (931) and a control valve (932).

The buttons (931) are connected movably to the shell (70). The control valve (932) is mounted in the shell (91), is connected to the buttons (931) and contacted with the valve (921) and has an inlet (933). When one of the buttons (931) is pushed to rotate the control valve (932), the inlet (933) will communicate with one of the through holes (922) in the valve (921) to change the flow direction of the compressed air.

However, the conventional air-inlet controlling assembly for the pneumatic tool has the following shortcomings.

1. The first and the second conventional air-inlet controlling assemblies as shown in FIGS. 5 and 6 can change the flow direction of the compressed air, but the cylinders (50,62) are respectively and directly contacted to the first conventional air-inlet controlling assembly and the plastic shell (60) and the moisture, the impurities or the oil gas contained in the compressed air will be rusted and damaged with the internal elements of the conventional pneumatic tool. Thus, the useful life of the conventional pneumatic tool is reduced due to the leakage of the compressed air. After the compressed air leaking into the chamber (61) of the shell (60), the compressed air may not control the conventional pneumatic tool precisely. In addition, the first conventional air-inlet controlling assembly and the shell (60) are made of plastic and may be affected by the temperature and can not contact with the cylinders (50,62) closely.

2. The third conventional air-inlet controlling assembly as shown in FIG. 7 can keep the compressed air from leaking into the shell (70), but a valve (81) is a necessary element for connecting the control shaft (82) with the shell (70) and the cylinder (80). This increases the cost for manufacturing the air-inlet controlling assembly.

3. Although, the forth conventional pneumatic tool (90) as shown in FIG. 8 can control the flow direction of the compressed air by pushing the buttons (931), mounting the valve (921) on the cylinder (92) is trouble and may increase the cost for manufacturing an air-inlet controlling assembly. In addition, the control valve (932) is made of plastic and may be affected by the temperature and can not contact with the valve (921) closely, then the compressed air may leak into the shell (91) from a gap between the valve (921) and the control valve (932).

The air-inlet controlling assembly for a pneumatic tool in accordance with the present invention mitigates or obviates the aforementioned problems.

SUMMARY OF THE INVENTION

The main objective of the present invention is to provide an air-inlet controlling assembly for a pneumatic tool with a plastic shell.

The air-inlet controlling assembly for a pneumatic tool having a gun shaped shell with a chamber and a handle communicated with the chamber has an air-inlet assembly, a cylinder assembly and a control valve. The air-inlet assembly is mounted in the handle of the shell and has an inlet tube, an airtight sleeve and a washer. The cylinder assembly is mounted in the shell, contacts with the airtight sleeve of the air-inlet assembly and has a cylinder and a rotor. The control valve is connected to the cylinder assembly and has a connecting portion and an operating portion.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
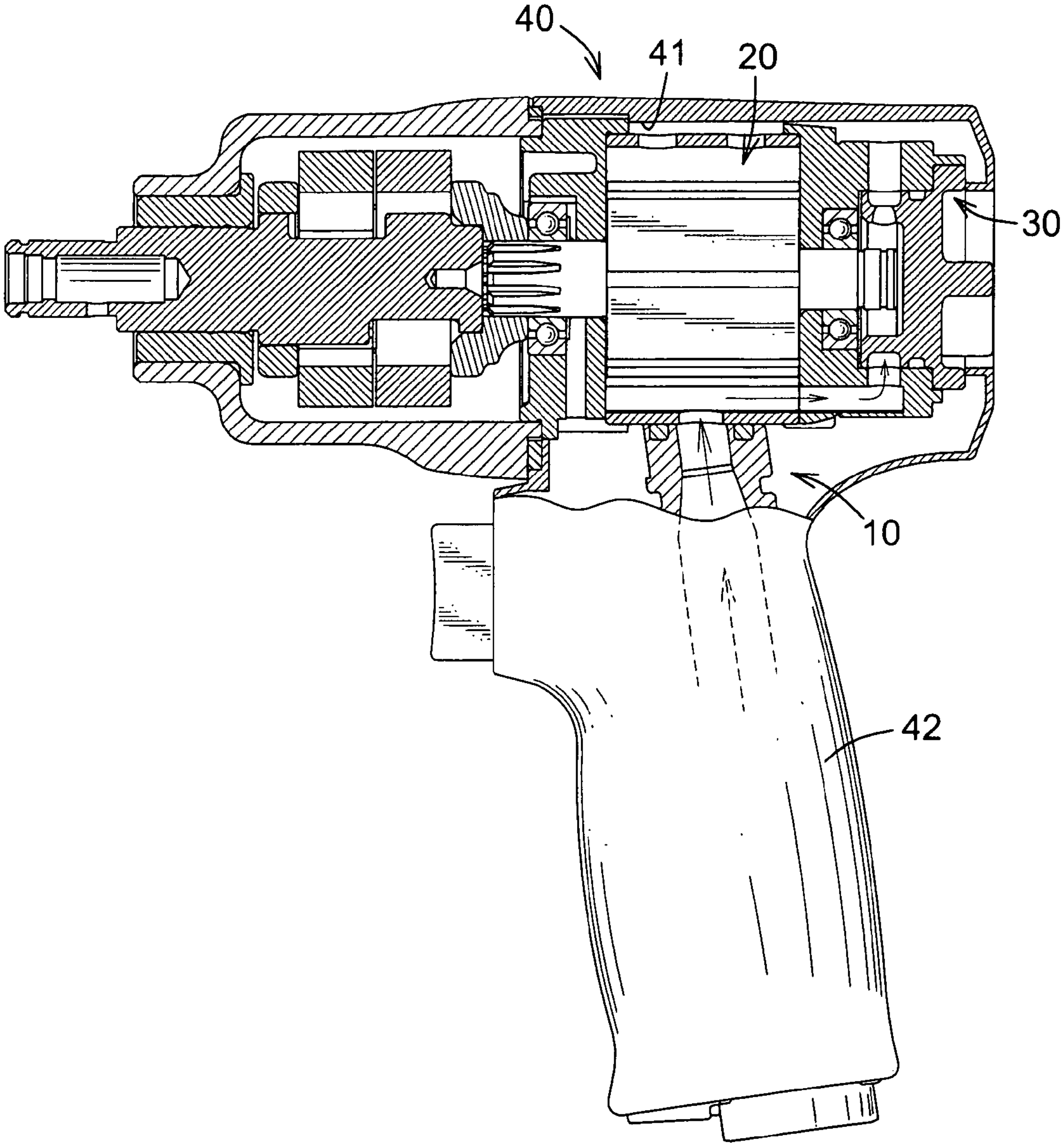
FIG. 1 is a side view in partial section of a pneumatic tool with an air-inlet controlling assembly in accordance with the present invention.
Figure 2:
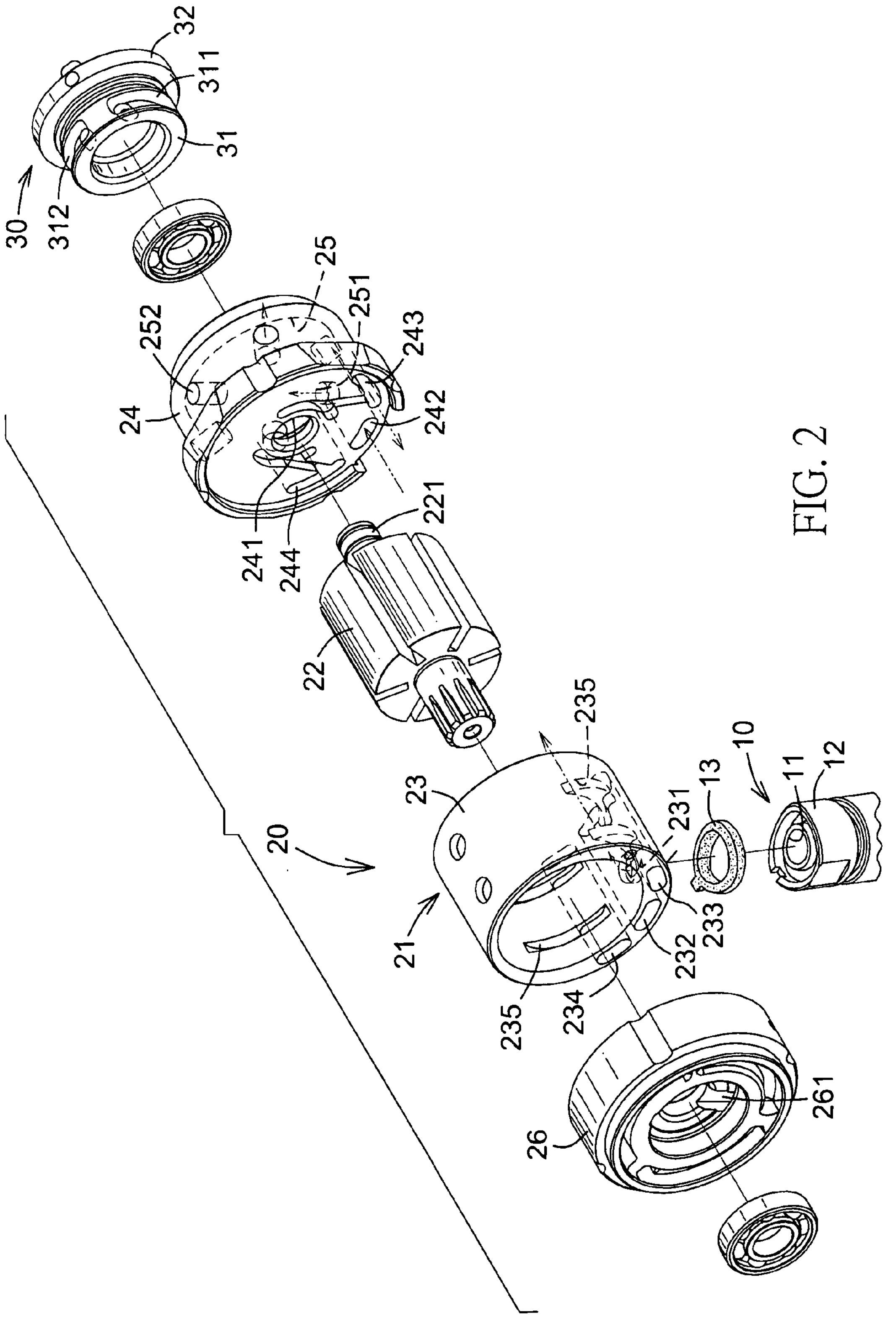
FIG. 2 is an exploded perspective view of the air-inlet controlling assembly in FIG. 1.

With reference to FIGS. 1 and 2, an air-inlet controlling assembly in accordance with the present invention for a pneumatic tool having a gun shaped shell (40) with a chamber (41) and a handle (42) communicated with the chamber (41) comprises an air-inlet assembly (10), a cylinder assembly (20) and a control valve (30).

The air-inlet assembly (10) is mounted in the handle (42) of the shell (40) and has an inlet tube (11), an airtight sleeve (12) and a washer (13). The inlet tube (11) has an inner end and an outer end to allow compressed air to flow into the inlet tube (11) from the outer end to the inner end. The airtight sleeve (12) is mounted around the inner end of the inlet tube (11) and has a curved end adjacent to the inner end of the inlet tube (11). The washer (13) is mounted around the inner end between the inlet tube (11) and the airtight sleeve (12).

The cylinder assembly (20) is mounted in the shell (40), is connected to the air-inlet assembly (10) and has a cylinder (21) and a rotor (22). The cylinder (21) is mounted in the chamber (41) and has a body (23), a front connecting element (26) and a rear connecting element (24).

The body (23) may be a tube, is mounted in the chamber (41), contacts with the airtight sleeve (12) and has an outer surface, an inner surface, a front end, a rear end, an inlet hole (231), a guiding groove (232), a forward groove (233), a reverse groove (234) and multiple curved grooves (235).

The outer surface of the body (23) is contacted closely with the curved end of the airtight sleeve (12) to prevent the compressed air leaking form the air-inlet assembly (10) and the cylinder assembly (20) into the chamber (41). The inlet hole (231) is formed through the body (23) from the outer surface to the inner surface and communicates with the inlet tube (11) to allow the compressed air to flow into the inlet hole (231) from the inlet tube (11). The guiding groove (232) is formed axially through the body (23) from the front end to the rear end, communicates with the inlet hole (231) and allows the compressed air to flow into the guiding groove (231). The forward groove (233) is formed through the body (23) from the front end to the rear end near the guiding groove (232). The reverse groove (234) is formed through the body (23) from the front end to the rear end near the guiding groove (232) away from the forward groove (233). The curved grooves (235) are formed in the inner surface of the body (23) and communicate respectively with the forward groove (233) and the reverse groove (234).

Figure 4:
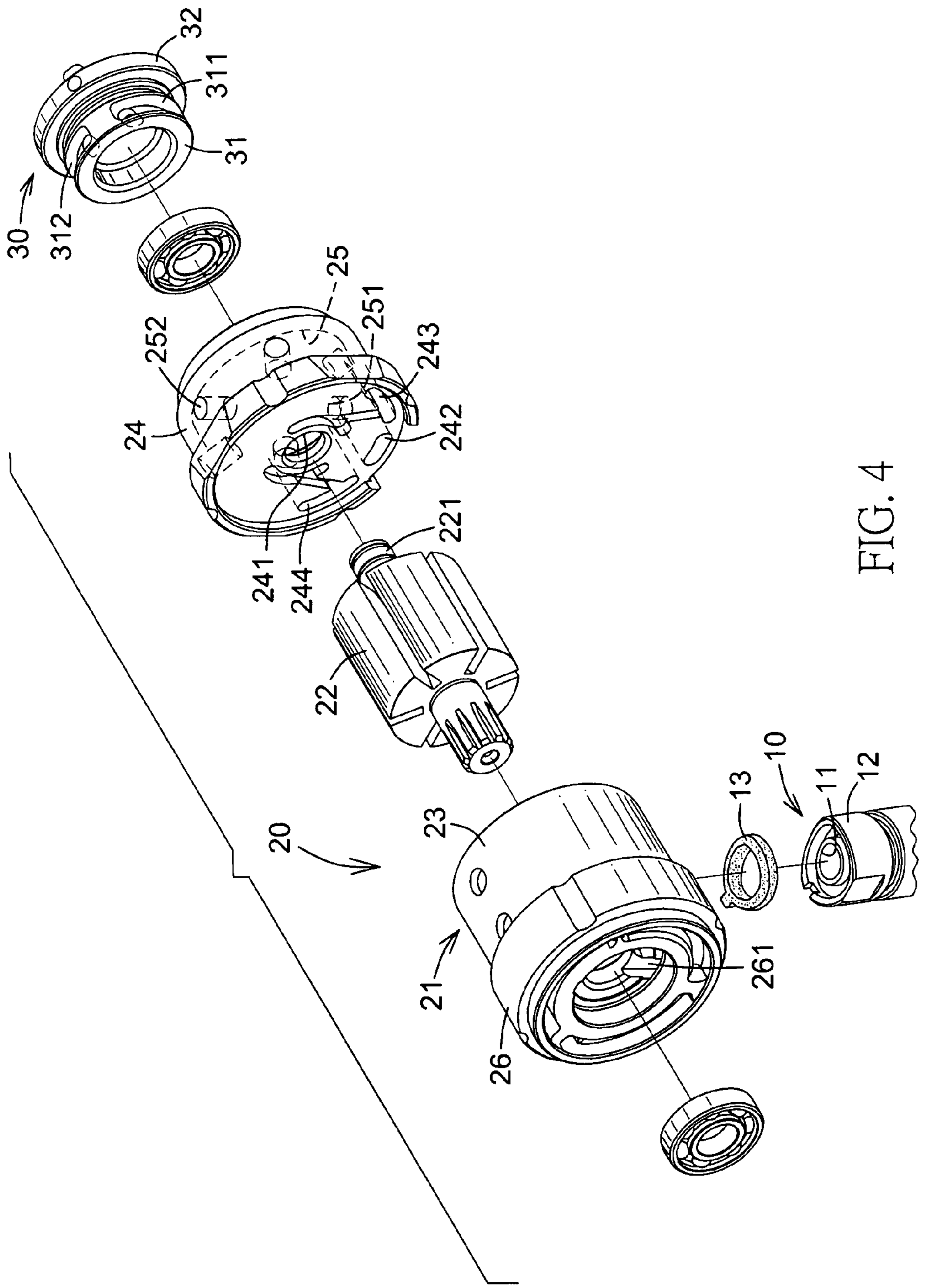
FIG. 4 is an exploded perspective view of a third embodiment of an air-inlet controlling assembly in accordance with the present invention.
Figure 5:
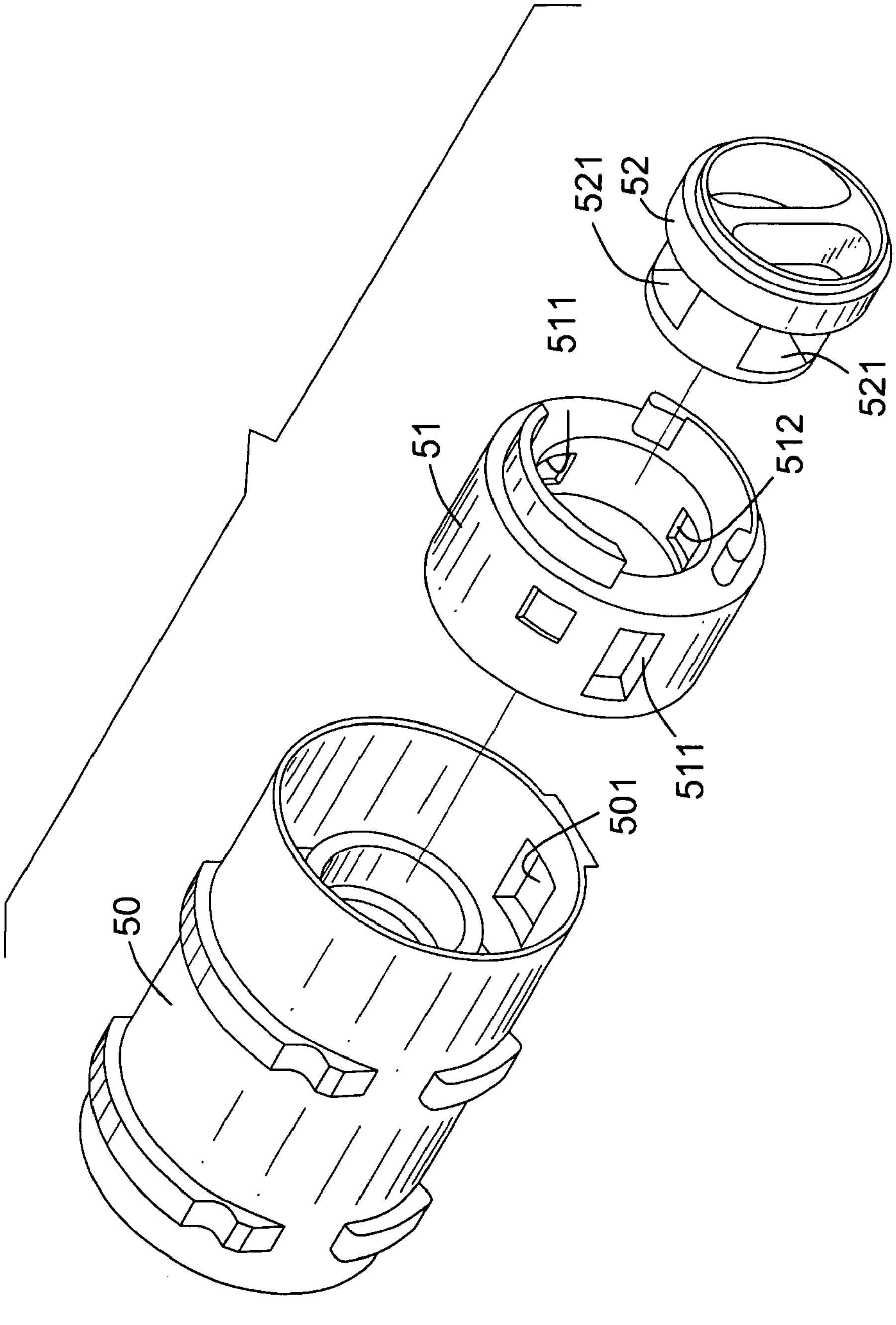
FIG. 5 PRIOR ART
FIG. 5 is an exploded perspective view of a first conventional air-inlet controlling assembly in accordance with the prior art.
Figure 6:
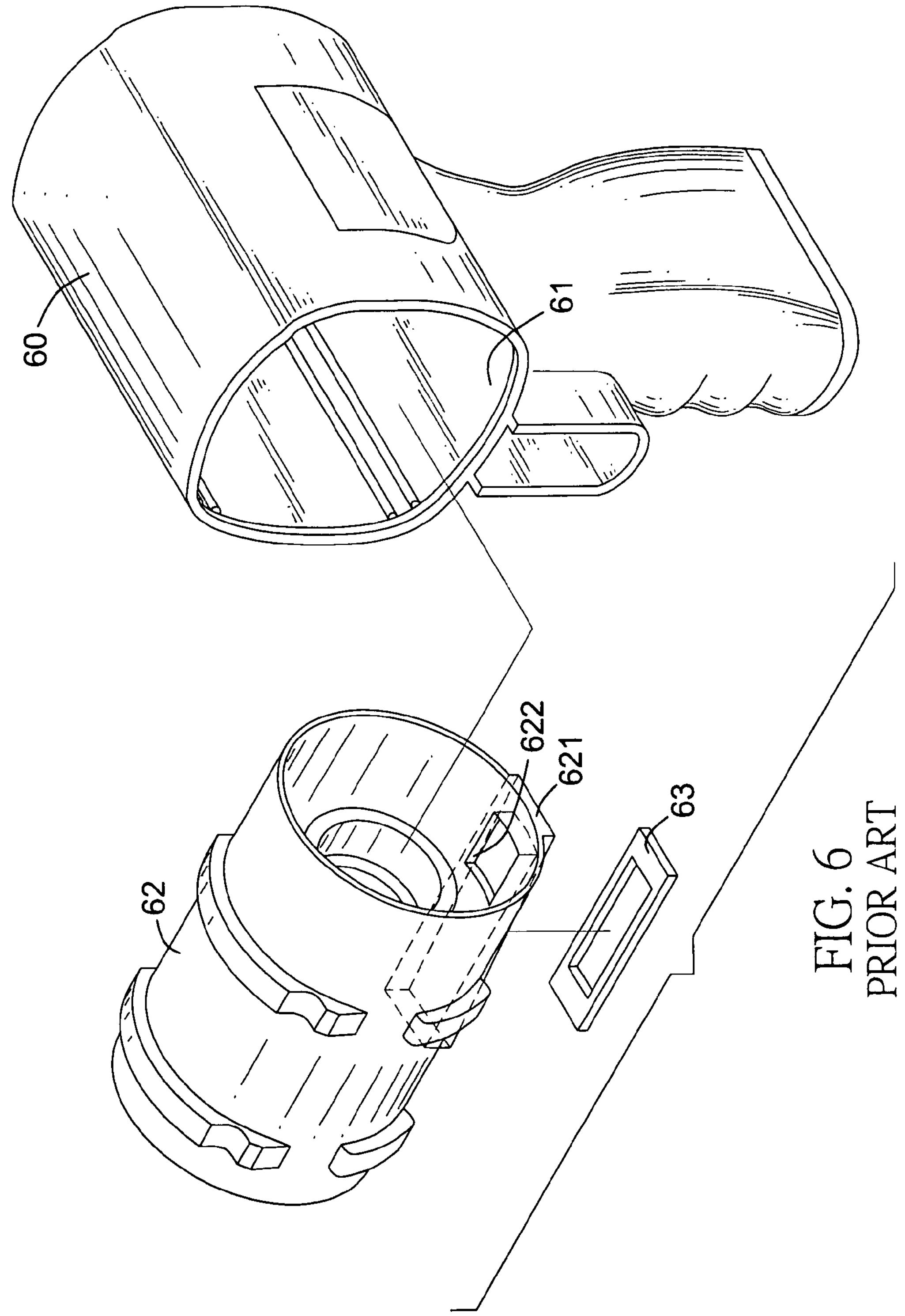
FIG. 6 PRIOR ART
FIG. 6 is an exploded perspective view of a pneumatic tool with a second air-inlet controlling assembly in accordance with the prior art.
Figure 7:
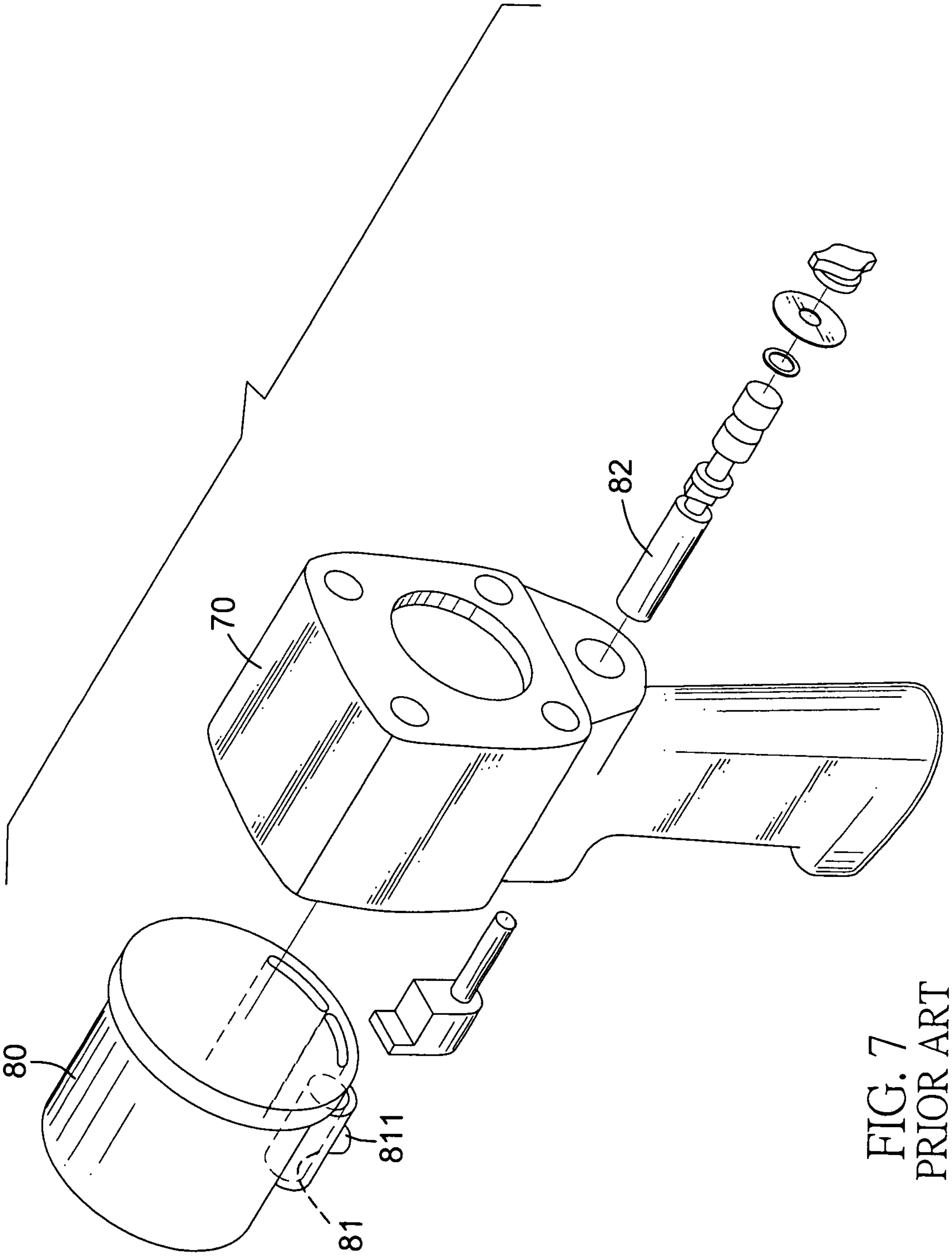
FIG. 7 PRIOR ART
FIG. 7 is an exploded perspective view of a pneumatic tool with a third conventional air-inlet controlling assembly in accordance with the prior art.
Figure 8:
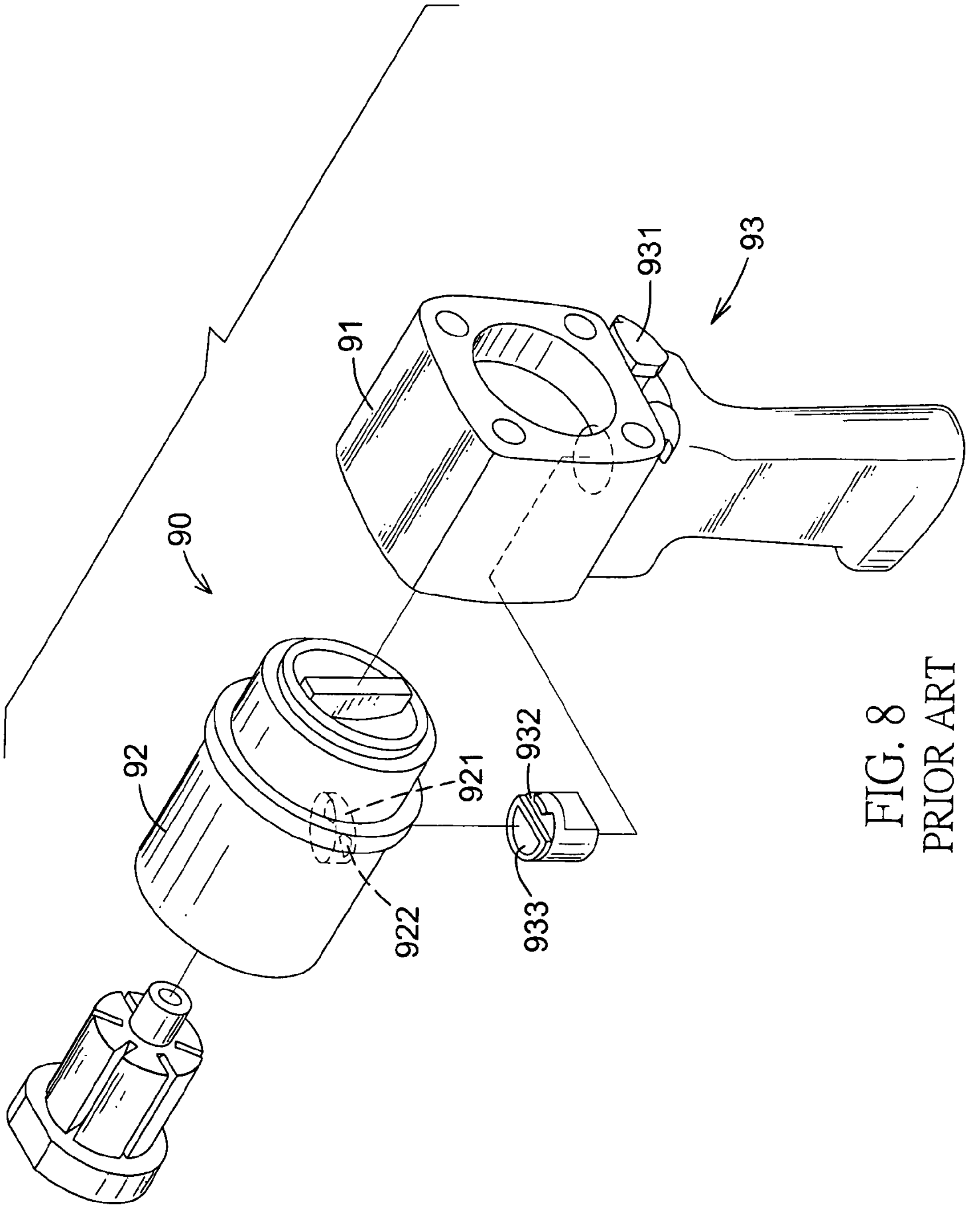
FIG. 8 PRIOR ART
FIG. 8 is an exploded perspective view of a pneumatic tool with a forth conventional air-inlet controlling assembly in accordance with the prior art.

The front connecting element (26) may be annular, may be connected or formed with the front end of the body (23) as shown in FIGS. 2 and 4, and has a center, a mounting groove (261) and a front bearing. The mounting recess (261) is formed in the center of the front connecting element (26). The front bearing is mounted in the mounting recess (261) of the front connecting element (26).

Figure 3:
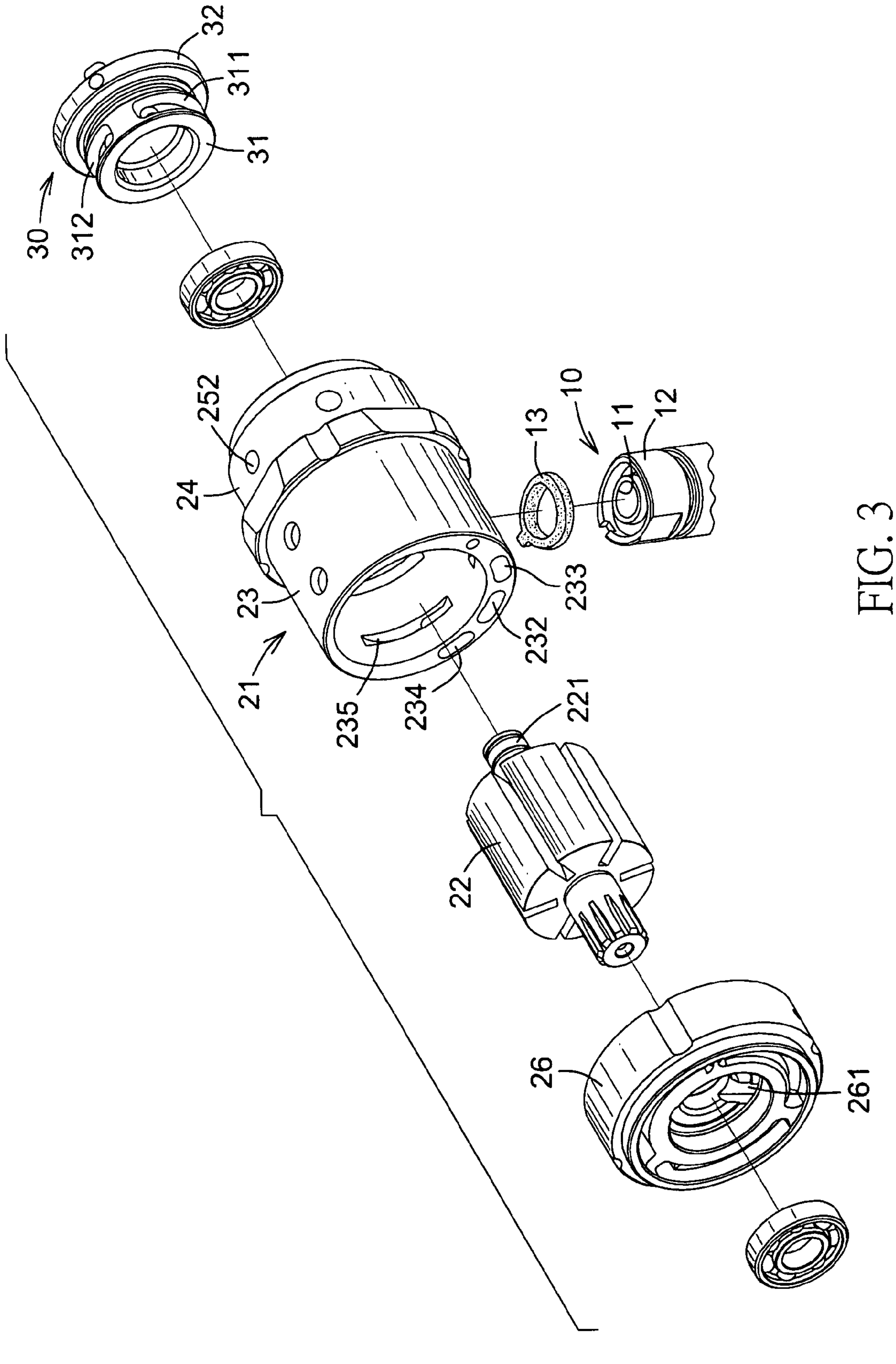
FIG. 3 is an exploded perspective view of a second embodiment of an air-inlet controlling assembly in accordance with the present invention.

The rear connecting element (24) may be annular, may be connected or formed with the rear end of the body (23) as shown in FIGS. 2 and 3, and has a center, a front side, a rear side, an inserting hole (241), a guiding groove (242), a forward port (243), a reverse port (244), a mounting recess (25), a guiding hole (251), multiple gas holes (252) and a rear bearing.

The inserting hole (241) is formed in the center of the rear connecting element (24) and corresponds to the mounting recess (261). The guiding groove (242) is formed axially in the rear connecting element (24) and communicates with the guiding groove (232) in the body (23) to allow the compressed air to flow into the guiding groove (242) in the rear connecting element (24). The forward port (243) is formed axially in the rear connecting element (24) near the guiding groove (242) and communicates with the forward groove (233) in the body (23). The reserve port (244) is formed axially in the rear connecting element (24) near the guiding groove (242) and away from the forward port (243) and communicates with the reverse groove (234) in the body (23).

The mounting recess (25) is formed axially in the rear side of the rear connecting element (24) and communicated with the inserting hole (241). The guiding hole (251) is radially formed in the rear connecting element (24) and communicates with the guiding groove (242) and the mounting recess (25) in the rear connecting element (24) to let the compressed air flow into the guiding hole (251) and the mounting recess (25).

The gas holes (252) are formed radially in the rear connecting element (24) near the rear side and communicate with the guiding hole (251) and the mounting recess (25). Furthermore, one of the gas holes (252) is communicated with the forward port (243) in the rear connecting element (24) and one of the gas holes (252) is communicated with the reverse port (244) in the rear connecting element (24). The rear bearing is mounted in the mounting recess (25).

The rotor (22) is mounted rotatably in the cylinder (21) and has a center and a driving shaft (221). The driving shaft (221) is formed on and protrudes from the center of the rotor (22) and has a proximal end and a distal end. The proximal end of the driving shaft (221) is extended through the body (23) and connected with the front bearing in the front connecting element (26). The distal end of the driving shaft (221) is inserted into the inserting hole (241) in the rear connecting element (24) and is connected to the rear bearing.

The control valve (30) is connected to the cylinder assembly (20) and has a front end, a rear end, a connecting portion (31) and an operating portion (32).

The connecting portion (31) may be hollow, is formed on the front end of the control valve (31), is mounted in the mounting recess (25), contacts with the rear bearing and has a diameter, an annular sidewall, a forward passageway (311) and a reverse passageway (312).

The forward passageway (311) and the reverse passageway (312) are separately formed on the annular sidewall of the connecting portion (31). The forward passageway (311) selectively communicates with the guiding hole (251) and the gas hole (252) corresponding to the forward port (243) in the rear connecting element (24). The reverse passageway (312) selectively communicates with the guiding hole (251) and the gas hole (252) corresponding to the reverse port (244) in the rear connecting element (24).

The operating portion (32) is formed with the connecting portion (31) to rotate the connecting portion (31), makes the guiding hole (251) communicating with the forward passageway (311) or the reverse passageway (312) and has a diameter larger than the diameter of the connecting portion (31).

With reference to FIGS. 1 and 2, the compressed air flows into the body (23) from the inlet tube (11), the inlet hole (231) and the guiding groove (232), then the compressed air flows into the rear connecting element (24) via the guiding groove (242), the guiding hole (251) and the mounting recess (25).

When the operating portion (32) of the control valve (30) is rotated to make the forward passageway (311) communicating with the guiding hole (251) and the gas hole (252) corresponding to the forward port (243), the compressed air will flow from the forward port (243) into the forward groove (233) and the corresponding curved grooves (235) to drive the rotor (22) to rotate in a forward direction.

When the operating portion (32) of the control valve (30) is rotated to make the reverse passageway (312) communicating with the guiding hole (251) and the gas hole (252) corresponding to the reverse port (244), the compressed air will flow from the reverse port (244) into the reverse groove (234) and the corresponding curved grooves (235) to drive the rotor (22) to rotating in a reverse direction.

Consequently, the flow direction of the compressed air can be changed with rotating the control valve (30), such that the pneumatic tool can be fasten or loosen the bolts and the nuts.

The air-inlet controlling assembly as described has the following advantages.

1. The airtight sleeve (12) can contact closely with the outer surface of the body (23) in the cylinder assembly (20), so the compressed air is kept from flowing into the chamber (41) of the shell (40) and the compressed air can control the pneumatic tool precisely.

2. The air-inlet controlling assembly does not need to form the valves (81, 921) on the cylinders (80, 92), and the cost for manufacturing an air-inlet controlling assembly is reduced.

Even though numerous characteristics and advantages of the present invention have been set forth in the foregoing description, together with details of the structure and features of the utility model, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An air-inlet controlling assembly for a pneumatic tool having a gun shaped shell with a chamber and a handle communicated with the chamber, and the air-inlet controlling assembly comprising
- an air-inlet assembly adapted to be mounted in the shell and having
  - an inlet tube adapted to be mounted in the handle and having an inner end; and
  - an airtight sleeve mounted around the inner end of the inlet tube and having a curved end adjacent to the inner end of the inlet tube; and
  - a washer mounted around the inner end of the inlet tube;
- a cylinder assembly adapted to be mounted in the shell, connected to the air-inlet assembly and having
  - a cylinder adapted to be mounted in the chamber and having
    - a body adapted to be mounted in the chamber, contacting closely with the curved end of the airtight sleeve and having a front end and a rear end;
    - a front connecting element connected with the front end of the body; and
    - a rear connecting element connected with the rear end of the body; and
  - a rotor mounted rotatably in the cylinder; and
- a control valve connected to the cylinder assembly.

2. The air-inlet controlling assembly for a pneumatic tool as claimed in claim 1, wherein
- the body has
  - an outer surface contacting closely with the curved end of the airtight sleeve;
  - an inner surface;
  - an inlet hole being formed in the body from the outer surface to the inner surface and communicating with the inlet tube;
  - a guiding groove being formed axially through the body from the front end to the rear end and communicating with the inlet hole;
  - a forward groove being formed through the body from the front end to the rear end near the guiding groove;
  - a reverse groove being formed through the body from the front end to the rear end near the guiding groove and away from the forward groove; and
  - multiple curved grooves being formed in the inner surface of the body and communicated respectively with the forward groove and the reverse groove;
- the front connecting element has
  - a center;
  - a mounting recess being formed in the center of the front connecting element; and
- the rear connecting element has
  - a center;
  - a front side;
  - a rear side;
  - an inserting hole being formed in the center of the rear connecting element and corresponding to the mounting recess in the front connecting element;
  - a guiding groove being formed axially in the rear connecting element and communicating with the guiding groove in the body;
  - a forward port being formed axially in the rear connecting element near the guiding groove and communicating with the forward groove in the body;
  - a reverse port being formed axially in the rear connecting element near the guiding groove and away from the forward port and communicating with the reverse groove in the body;

a mounting recess being formed axially in the rear side of the rear connecting element and communicating with the inserting hole;

a guiding hole being radially formed in the rear connecting element and communicating with the guiding groove and the mounting recess in the rear connecting element;

multiple gas holes being formed radially in the rear connecting element near the rear side and communicating with the guiding hole and the mounting recess, and one of the gas holes being communicated with the forward port in the rear connecting element and one of the gas holes being communicated with the reverse port in the rear connecting element.

3. The air-inlet controlling assembly for a pneumatic tool as claimed in claim 2, wherein the front connecting element is annular, the body of the cylinder is a hollow and the rear connecting element is annular.

4. The air-inlet controlling assembly for a pneumatic tool as claimed in claim 3, wherein the front connecting element has a front bearing being mounted in the mounting recess of the front connecting element;

the rear connecting element has a rear bearing being mounted in the mounting recess of the front connecting element; and the rotor has a center; and a driving shaft being formed on and protruding from the center of the rotor and having a proximal end being extended through the body and connected with the first bearing in the front connecting element; and a distal end being inserted into the inserting hole in the rear connecting element and connected with the rear bearing.

5. The air-inlet controlling assembly for a pneumatic tool as claimed in claim 4, wherein the control valve has a front end;

a rear end;

a connecting portion being formed on the front end of the control valve, being mounted in the mounting recess and having an annular sidewall;

a forward passageway being formed in the annular sidewall of the connecting portion to selectively communicate with the guiding hole and the gas hole corresponding to the forward port in the rear connecting element; and a reverse passageway being formed in the annular sidewall of the connecting portion to selectively communicate with the guiding hole and the gas hole corresponding to the reverse port in the rear connecting element; and an operating portion being formed with the connecting portion to rotate the connecting portion to make the guiding hole communicate with one of the forward passageway and the reverse passageway.

6. The air-inlet controlling assembly for a pneumatic tool as claimed in claim 5, wherein the connecting portion is hollow and has a diameter; and the operating portion has a diameter larger than the diameter of the connecting portion.

7. The air-inlet controlling assembly for a pneumatic tool as claimed in claim 6, wherein the front connecting element is formed with the front end of the body.

8. The air-inlet controlling assembly for a pneumatic tool as claimed in claim 7, wherein the rear connecting element being formed with the rear end of the body.

9. The air-inlet controlling assembly for a pneumatic tool as claimed in claim 1, wherein the front connecting element is formed with the front end of the body.

10. The air-inlet controlling assembly for a pneumatic tool as claimed in claim 1, wherein the rear connecting element being formed with the rear end of the body.

11. The air-inlet controlling assembly for a pneumatic tool as claimed in claim 1, wherein the front connecting element is annular, the body of the cylinder is hollow and the rear connecting element is annular.

12. The air-inlet controlling assembly for a pneumatic tool as claimed in claim 1, wherein the front connecting element has a front bearing being mounted in the mounting recess of the front connecting element;

the rear connecting element has a rear bearing being mounted in the mounting recess of the rear connecting element; and the rotor has a center; and a driving shaft being formed on and protruding from the center of the rotor and having a proximal end being extended through the body of the cylinder and connected with the first bearing in the front connecting element; and a distal end being inserted into the inserting hole in the rear connecting element and connected with the rear bearing.

13. The air-inlet controlling assembly for a pneumatic tool as claimed in claim 1, wherein the control valve has a front end;

a rear end;

a connecting portion being formed on the front end of the control valve, being mounted in the rear connecting element and having an annular sidewall;

a forward passageway being formed in the annular sidewall of the connecting portion; and a reverse passageway being formed in the annular sidewall of the connecting portion; and an operating portion being formed with the connecting portion.

14. The air-inlet controlling assembly for a pneumatic tool as claimed in claim 1, wherein the connecting portion is hollow and has a diameter; and the operating portion has a diameter larger than the diameter of the connecting portion.

* * * * *